(12) United States Patent
Nakamura

(10) Patent No.: US 7,175,894 B2
(45) Date of Patent: Feb. 13, 2007

(54) PHOTO-CURING HOLLOW STRUCTURE

(75) Inventor: Tetsuya Nakamura, Ohtawara (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/747,161

(22) Filed: Dec. 30, 2003

(65) Prior Publication Data

US 2004/0175521 A1    Sep. 9, 2004

Related U.S. Application Data

(63) Continuation of application No. PCT/JP02/06854, filed on Jul. 5, 2002.

(30) Foreign Application Priority Data

Jul. 9, 2001    (JP)    ............... 2001-208091

(51) Int. Cl.
- B32B 1/08    (2006.01)
- C08F 2/48    (2006.01)
- E04B 1/34    (2006.01)
- E04G 11/04    (2006.01)
- E04H 15/34    (2006.01)
- B29D 22/00    (2006.01)

(52) U.S. Cl. .................. 428/35.2; 428/35.7; 428/36.1; 428/36.2; 428/36.91; 522/6; 52/2.15; 52/2.11; 52/79.5; 52/223.8; 52/745.02; 135/122; 220/62.19; 220/62.21; 220/651; 220/654

(58) Field of Classification Search ............... 428/35.2, 428/35.7, 36.1, 36.2, 36.91; 522/6; 52/2.15, 52/2.11, 79.5, 223.8, 745.02; 135/122; 220/62.19, 220/62.21, 651, 654

See application file for complete search history.

(56) References Cited

U.S. PATENT DOCUMENTS

| | | | | |
|---|---|---|---|---|
| 4,466,993 A | * | 8/1984 | Hsu et al. | 427/501 |
| 4,515,737 A | * | 5/1985 | Karino et al. | 264/477 |
| 5,728,633 A | | 3/1998 | Jacobs | |
| 5,732,743 A | * | 3/1998 | Livesay | 138/99 |
| 6,316,089 B1 | * | 11/2001 | Ohtani et al. | 428/300.7 |
| 6,630,246 B1 | * | 10/2003 | Yanagase et al. | 428/520 |

FOREIGN PATENT DOCUMENTS

| | | | |
|---|---|---|---|
| JP | 5-302400 | | 11/1993 |
| JP | 05320381 A | * | 12/1993 |
| JP | 2728081 | | 3/1998 |
| JP | 2916330 | | 7/1999 |

OTHER PUBLICATIONS

Machine Translation of JP 05-320381.*
Machine Translation of JP 06-081427.*

* cited by examiner

Primary Examiner—Alicia Chevalier
Assistant Examiner—Chris Bruenjes
(74) Attorney, Agent, or Firm—Nixon & Vanderhye

(57) ABSTRACT

The present invention comprises a fluid-injectable internal bag layer, a base-material layer superposed on an external periphery of the internal bag layer and impregnated with a photo-curing resin, and an outer layer superposed on an external periphery of the base-material layer and having transparency. The base-material layer is formed of a composite member serving as a reinforcing fiber layer impregnated with the photo-curing resin, and a grid net superposed on the composite member and preventing flow of the photo-curing resin.

5 Claims, 8 Drawing Sheets

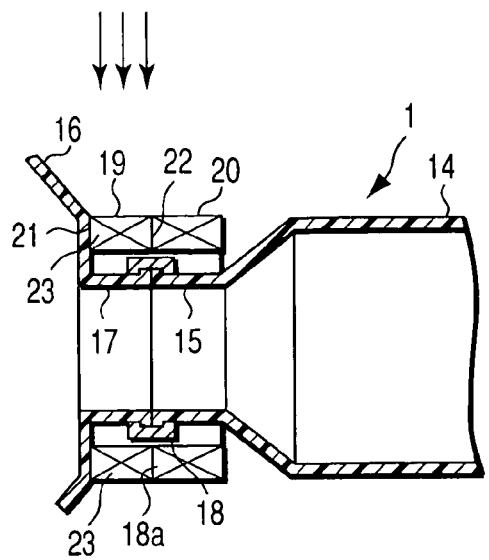
FIG. 9A
FIG. 9B
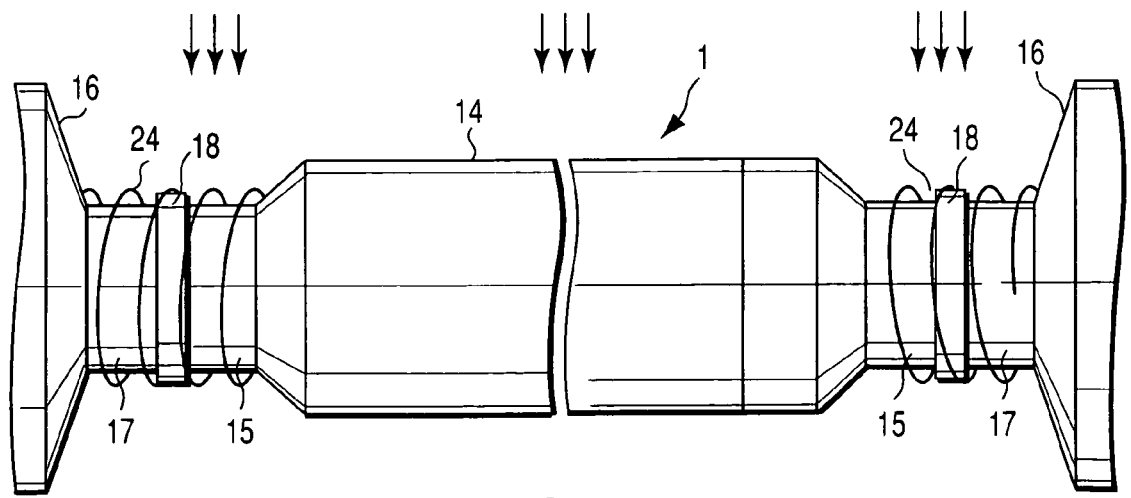
FIG. 10

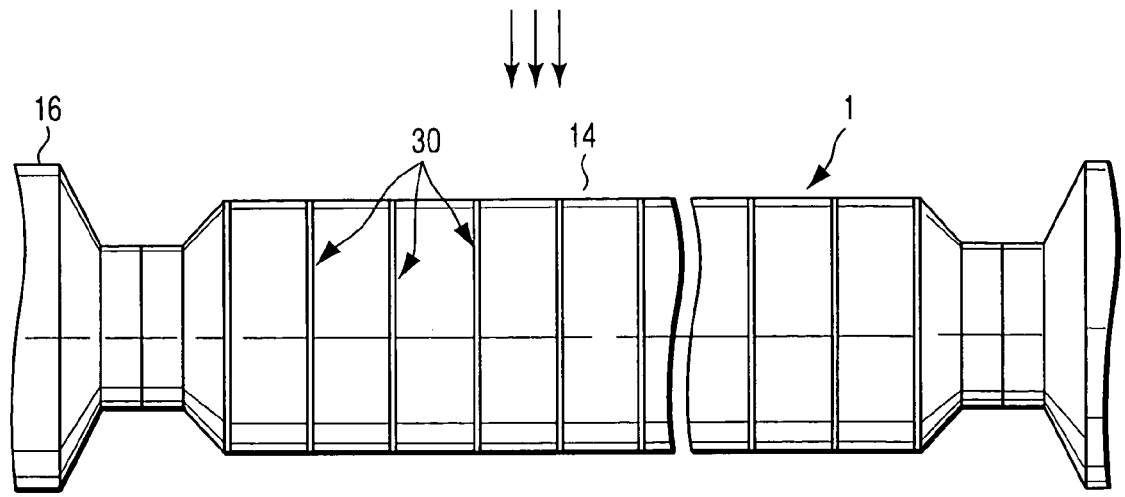
F I G. 12
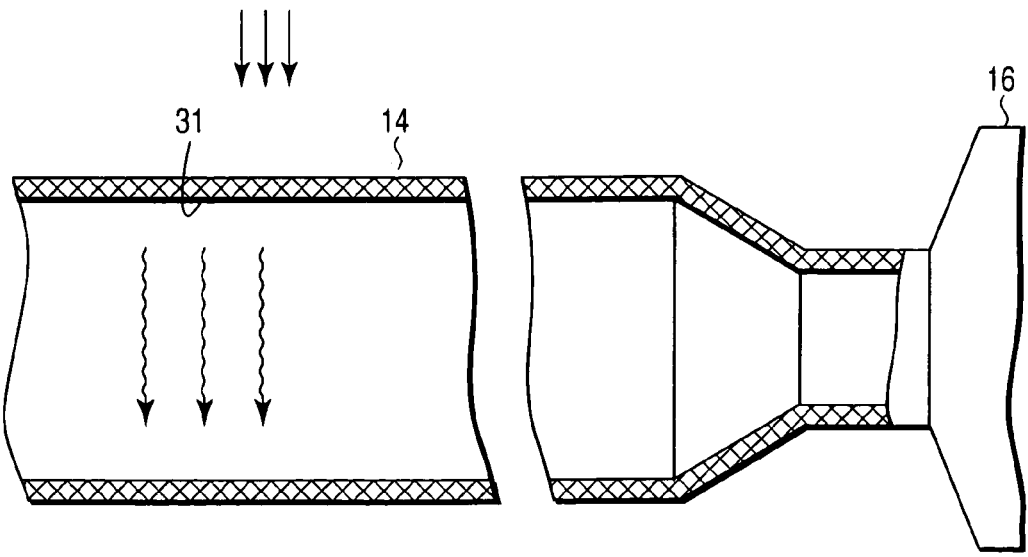
F I G. 13

PHOTO-CURING HOLLOW STRUCTURE

CROSS-REFERENCE TO RELATED APPLICATIONS

This is a Continuation Application of PCT Application No. PCT/JP02/06854, filed Jul. 5, 2002, which was not published under PCT Article 21(2) in English.

This application is based upon and claims the benefit of priority from the prior Japanese Patent Application No. 2001-208091, filed Jul. 9, 2001, the entire contents of which are incorporated herein by reference.

BACKGROUND OF THE INVENTION

1. Field of the Invention

This invention relates to a photo-curing hollow structure, which expands by injection of fluid and is cured by light such as sunlight and the like to form a hollow molded structure, and a method of curing the same.

2. Description of the Related Art

In an emergency due to natural or man-made disasters, there are cases where temporary housing such as prefabricated houses and tents are set up, to aid victims thereof. In such cases, many setup materials such as columns, panels and tents prefabricated in factories are carried by trucks and the like, and they are assembled and installed on the spot.

However, the larger scale the prefabricated houses and tents have, the more number of parts of the setup materials they requires. Further, the sizes of the columns and panels thereof increase, and it is troublesome to store, carry, and assemble and install them in the field. In particular, it is troublesome to carry materials to places, access to which is difficult, such as intermontane areas and remote areas.

Further, with respect to outdoor installation equipments, such as various play equipments installed in playgrounds and playland and the like, products molded in the aimed shapes in factories in advance are carried by trucks or the like and assembled and installed in the field. Also in this kind of things, those large-sized are voluminous and the installation work thereof, such as transportation, is troublesome.

A photo-curing hollow structure which has solved the above problem are registered as the Japanese Patent No. 2916330 (filed on Aug. 31, 1992). This structure is formed as a semi-finished product in the aimed shape when it is unused. Since photo-curing resin impregnated into a base material layer of the photo-curing hollow structure has flexibility in a gel state, the structure is stored in compact form in a storage bag or a case, in the state of being folded or rolled up small. Therefore, it can be kept in a warehouse and carried very easily, in the unvoluminous state.

When it is used, the photo-curing hollow structure is taken out from the storage bag or case in the field. Then, the whole structure is quickly swollen by injecting gas or water by a compressor or a proper gas generator into an internal bag layer thereof. Then, the structure is subjected to direct sunlight or light of an artificial light source, while being maintained in the swollen state. Thereby, the light permeates a translucent outer layer on the periphery of the structure, and impinges on the photo-curing resin in the base material layer. Exposed to the light, the photo-curing resin is cured and the base material layer is set, and thereby the structure is changed to a hollow molded structure having a predetermined shape for the intended purpose. The hollow molded structure can be installed and used as it is, or after extracting the injected fluid, such as water.

The structure can be stored and carried very easily and reduce the costs. Further, when it is used, it can be installed and used as a hollow molded structure of a predetermined shape suitable for its purpose by a very simple work in the installation field for a short time.

An extension structure of a space structure is registered as Japanese Patent No. 2728081 (filed on Apr. 15, 1996). This invention has an extendable extension part which extends a space structure, such as an antenna and a solar-cell paddle in a spacecraft, and is fixed onto the spacecraft. The extension part is made of shape memory alloy, which is stored in the spacecraft when the spacecraft is launched, and extends by heat of sunlight in the space after launching. Further, the surface of hull of the extension part is coated with a UV-curing resin.

However, the structure has a problem that the photo-curing resin sealed in its base-material layer is localized due to gravity. Specifically, while the hollow structure is stored or transported, the uncured photo-curing resin is collected in the bottom of the structure due to gravity. Therefore, it may occur also in transportation means in which the structure has a high acceleration, such as when it is released from a transport, launched with a rocket, or landed on another celestial body. Further, if curing is performed with sunlight, the structure has a problem that it has a difference in the curing speed between the front and the back due to the difference in temperature between them. Specifically, photo-curing resins are cured by exposing them to light. If the resin is cured outdoors or in the space with sunlight, it is rare that the resin is uniformly exposed to sunlight, and consequently the difference in the temperature between the front and the back increases. Further, in some kinds of photo-curing resins, curing is accelerated by temperature. Therefore, difference in the curing speed increases by the difference in the temperature in addition to the difference in exposure to light, and the whole structure may be distorted.

The present invention has been made in view of the above circumstances. An object of the present invention is to provide a photo-curing hollow structure which can inhibit localization of its photo-curing resin due to gravity and form a hollow molded structure having a predetermined shape suitable for its purpose.

Another object of the present invention is to provide a method of curing a photo-curing hollow structure, in which both end portions of the photo-curing hollow structure are rotatably supported, the photo-curing hollow structure is rotated during a curing process, direct sunlight or light of an artificial light source is uniformly transmitted through an outer layer, and thereby the whole structure can be cured almost simultaneously.

BRIEF SUMMARY OF THE INVENTION

This invention provides a photo-curing hollow structure, comprising:

a fluid-injectable internal bag layer;

a base-material layer superposed on an external periphery of the internal bag layer and impregnated with a photo-curing resin; and an outer layer superposed on an external periphery of the base-material layer and having transparency, the hollow structure having, in an unused state, flexibility and being stored and kept in a light-tight storage bag or case, the hollow structure when used being taken out of the storage bag or case, wholly expanded by injection of a fluid into the internal bag layer, and formed into a hollow molded structure by direct sunlight or light of an artificial light source passing through the outer layer and curing the base-material layer in an expanded state, wherein the base-material layer comprises a reinforcing fiber layer impregnated with the photo-curing resin, and a flow-resisting member superposed on the reinforcing fiber layer and preventing flow of the photo-curing resin.

Further, the base-material layer comprises a reinforcing fiber layer impregnated with the photo-curing resin, and a flow-resisting member which prevents circumferential flow of the photo-curing resin, the flow-resisting member woven on the reinforcing fiber layer, arranged at desired intervals in a circumferential direction of the base-material layer, and extending over a longitudinal direction of the base-material layer.

Further, the base-material layer comprises a reinforcing fiber layer impregnated with the photo-curing resin, and pre-cured members arranged in portions of the reinforcing fiber layer and preventing flow of the photo-curing resin.

Further, fiber having high thermal conductivity is mixed into a reinforcing fiber layer forming the base-material layer, the reinforcing fiber layer impregnated with a photo-curing resin.

Further, the internal bag layer is formed of a transparent film through which direct sunlight or light of an artificial light source passes.

Further, this invention provides a method of curing a photo-curing hollow structure, the hollow structure having, in an unused state, flexibility and being stored and kept in a light-tight storage bag or case, the hollow structure when used being taken out of the storage bag or case, wholly expanded by injection of a fluid into the internal bag layer, and formed into a hollow molded structure by direct sunlight or light of an artificial light source passing through the outer layer and curing the base-material layer in an expanded state, the method comprising:

rotatably supporting both end portions of the photo-curing hollow structure; and rotating the photo-curing hollow structure in a curing process, and applying direct sunlight or light of an artificial light source uniformly to the base-material layer.

BRIEF DESCRIPTION OF THE SEVERAL VIEWS OF THE DRAWING

FIGS. 9A and 9B are operation explanatory diagrams illustrating the embodiment.

FIG. 10 is a side view illustrating a fifth embodiment of the present invention, with a cross-sectional view of a part of a structure in which a plurality of truss members are connected to a node member.

FIG. 12 is a side view illustrating a seventh embodiment of the present invention, including a structure in which a truss member is connected to a node member.

FIG. 13 is a vertically-cross-sectioned side view of an eighth embodiment of the present invention, including a structure in which a truss member is connected to a node member.

DETAILED DESCRIPTION OF THE INVENTION

Embodiments of the present invention will now be explained based on drawings.

Figure 1:
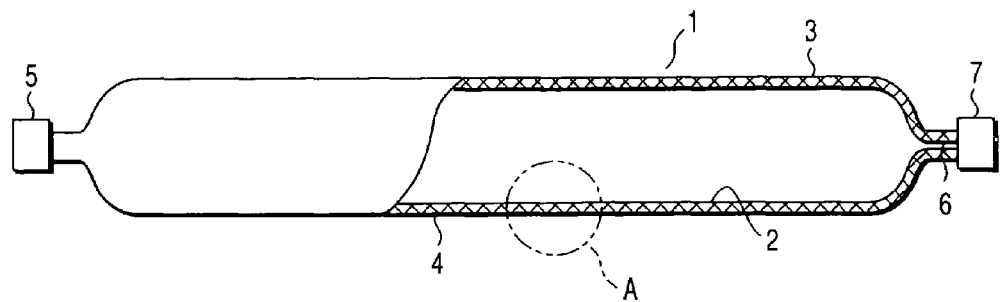
FIG. 1 is a side view illustrating a first embodiment of the present invention, with a partial cross section of a photo-curing hollow structure.
Figure 2:
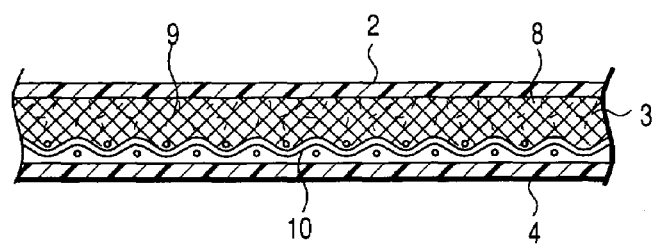
FIG. 2 is an enlarged cross-sectional view of a part A of FIG. 1, illustrating the embodiment.
Figure 3:
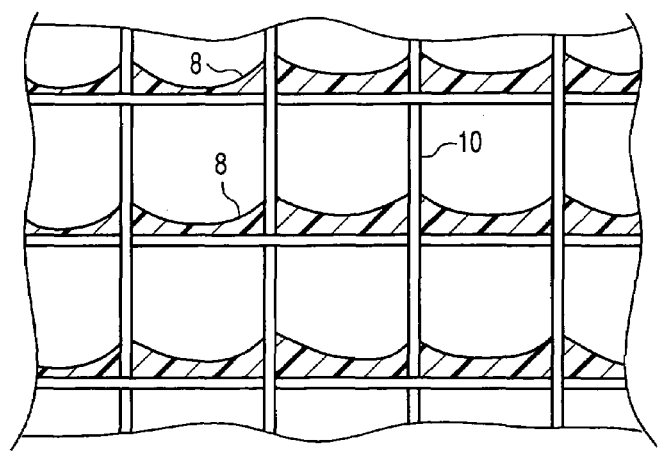
FIG. 3 is an operation explanatory diagram illustrating the embodiment.
Figure 4A:
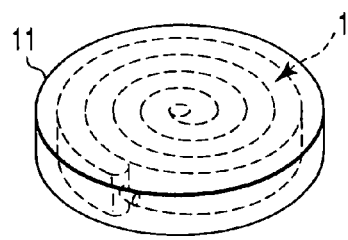
FIG. 4A is a perspective view of a storage bag of the embodiment.
Figure 4B:
FIG. 4B is a diagram illustrating a state where the photo-curing hollow structure is extracted from the storage bag of the embodiment.
Figure 4C:
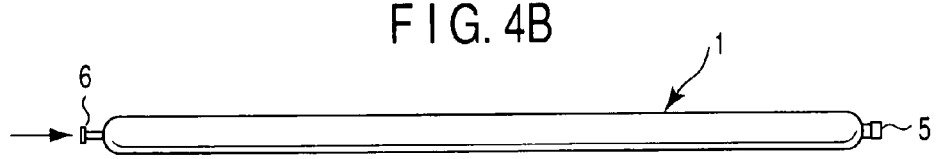
FIG. 4C is a diagram illustrating a state where the photo-curing hollow structure of the embodiment is expanded and cured.
Figure 4D:
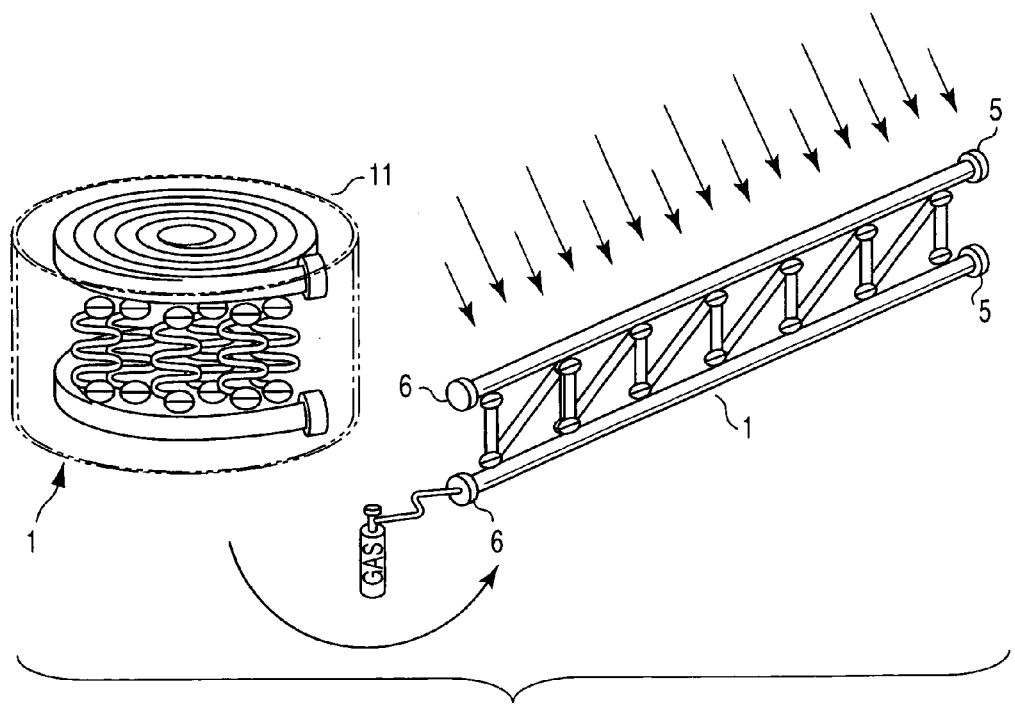
FIG. 4D is a diagram illustrating a state where a large-sized photo-curing hollow structure of the embodiment is stored in the storage bag, and a state where the photo-curing hollow structure is expanded and cured.

FIGS. 1 to 4D illustrate a first embodiment. FIG. 1 is a partial cross-sectional side view of a photo-curing hollow structure for obtaining a columnar hollow molded structure which is suitably installed and used as a column or a beam (pipe) for outdoor equipments and the like, such as buildings and play equipments. FIG. 2 is an enlarged cross-sectional view of part A of FIG. 1, FIG. 3 is an operation explanatory diagram, FIG. 4A is a perspective view of a storage bag, FIG. 4B is a diagram illustrating a state where the photo-curing hollow structure is extracted from a storage bag, FIG. 4C is a diagram illustrating a state where the photo-curing hollow structure is expanded and cured, and FIG. 4D is a diagram illustrating a state where the whole of, or the whole large frame of, a large-size tent is manufactured by a photo-curing hollow structure and is stored in the storage bag, and a state where the photo-curing hollow structure is expanded and cured.

As shown in FIGS. 1 and 2, a photo-curing hollow structure 1 comprises an internal bag layer 2, a base-material layer 3 provided on the external periphery of the internal bag layer 2, and an outer layer 4 provided on the external periphery of the base-material layer 3. The whole structure is formed in a long hollow cylindrical columnar shape.

The internal bag layer 2 is a flexible tube made of synthetic rubber, transparency film or vinyl and the like. One end of the internal bag layer 2 is blocked by a connection fitting 5, or can pass gas through to another member via a connector or a channel in its axial line portion. The other end of the internal bag layer 2 is provided with an injection port 6 through which gas, air or liquid can be injected from the outside. It is configured to be expanded in a cylindrical shape by injecting gas or air through the injection port 6, and be airtighted and maintain the expanded state by sealing the injection port 6 with a connection fitting 7 in the expanded state.

The base-material layer 3 is made of a composite member 9 made by impregnating cloth or mat-like base fabric, such as a fiber nonwoven fabric or woven fabric, serving as a reinforcing fiber layer with a liquid photo-curing resin 8. Further, around the composite member 9, a grid-shaped net 10 is superposed on the composite material 9 so as to enclose the composite member 9.

As shown in FIG. 3, the net 10 is formed by weaving synthetic fiber yarn into a grid, and functions as a flow-resisting member which prevents flow of the photo-curing resin 8. A mesh size of the grid of the net 10 is about 10 mm to 50 mm, and depends on the size of the photo-curing hollow structure 1. The direction of the mesh may be the direction of 0°/90°, or 45°/−45°.

The photo-curing resin 8 of the base-material layer 3 is made by mixing polyester resin or the like with a photo-curing agent in advance, for example, a commercial agent such as benzoin or phosphine oxide (e.g. Lucirin TPO manufactured by BASF), or by mixing epoxy resin or the like with a light-cation initiator (e.g. UV-9380C manufactured by GE Silicones). The photo-curing resin has a feature of being cured by exposure to direct sunlight or light of an artificial light source (mainly ultraviolet rays) for a certain time or more.

The outer layer 4 is a tube formed of transparent material such as vinyl or FEP film or polyester-film which has flexibility and transparency. The outer layer 4 is provided to coat the external periphery of the base-material layer 3, and functions as a protection of the photo-curing resin 8 which is impregnated into the base fabric and in the gel state before being cured. Further, the outer layer has a function of passing light for curing the photo-curing resin 8 through from the outside, when the structure is used. The outer layer 4 may be reinforced with fiber or the like adhered onto the back surface thereof.

If the photo-curing hollow structure 1 configured as described above is used as a column or a beam (pipe), it can be connected to another photo-curing hollow structure 1 or another member with connection fittings 5 and 7.

Further, at the time of being formed as the above semi-finished product, the photo-curing hollow structure 1 is configured such that the photo-curing resin 8 of the base-material layer 3 is not cured by exposure to light, when it is not used. Specifically, the structure is packed and stored in a light-tight storage bag 11 (it may be a case such as a box, as long as it is light-tight) shown in FIG. 4A. In this case, all of the internal bag layer 2, the base-material layer 3 and the outer layer 4 have flexibility. Therefore, the internal layer 2, the base-material layer 3 and the outer layer 4 are folded small or rolled up small together and stored compactly in the storage bag 11 or a case.

The photo-curing hollow structure 1 configured as described above is formed in the above semi-finished product in the intended shape, when it is unused. Since the photo-curing resin 8 impregnated into the base-material 3 is in the gel state and flexible, the whole structure can be rolled up or folded small and stored compact in size in the storage bag 11 or a case. Therefore, the photo-curing hollow structure 1 can be stored in a warehouse or the like without being bulky, and transported to the field very easily in the compact state.

During the storage and transportation, since the storage bag 11 or case is light-tight, no light intrudes, and the photo-curing resin 8 of the base-material layer 3 is not cured but maintained at the gel state. Even if the photo-curing resin 8 is in the gel state, the internal bag layer 2 is provided on the internal periphery thereof, and the outer layer 4 is provided on the external periphery thereof. Therefore, the photo-curing hollow structure 1 has no disadvantage that contacting portions thereof adhere to each other when it is folded or rolled up, and that it adheres to the storage bag 11 or case.

When it is used, after the structure is transported to the field where it is to be used, the storage bag 11 is opened there, and the photo-curing hollow structure 1 is taken out and stretched as shown in FIG. 4B. In the state where the photo-curing hollow structure 1 is stretched, air or gas is quickly injected into the internal bag layer 2 through the injection port 6. Means for injecting air or gas is a compressor (not shown) or a proper gas generator (e.g. an apparatus using a catalyst, such as a high-pressure tank, a cylinder, and an airbag of a vehicle). When air or gas is injected, the whole structure, together with the internal bag layer 2, is inflated to have a cylindrical shape as shown in FIG. 4C.

The photo-curing hollow structure 1 maintained in the inflated state is exposed to direct sunlight or light of an artificial light source for a certain amount of time. In this state, the light passes through the translucent outer layer 4 on the periphery thereof and impinges on the photo-curing resin 8 of the base-material layer 3. Thereby, the photo-curing resin 8 is cured, and the base-material layer 3 is hardened. Therefore, the whole photo-curing hollow structure 1 changes to have the predetermined cylindrical shape, as shown in FIG. 1, for the intended purpose. The structure in the state is installed and used as a column or a beam (pipe), etc., according to the purpose.

During the storage or transportation of the photo-curing hollow structure 1 or curing of the photo-curing resin 8, uncured photo-curing resin 8 tends to flow downwards due to gravity. Specifically, if the photo-curing hollow structure 1 is vertically stood up with the connection fitting 5 located at the bottom, the photo-curing resin 8 in the base-material layer 3 gradually tends to go downward in the vertical direction by gravity. Further, if the photo-curing hollow structure 1 is laid, the photo-curing resin 8 in the base-material layer 3 tends to gradually circulate in the circumferential direction and move to the bottom side. However, the grid net 10 functioning as a flow-resisting member which prevents the photo-curing resin 8 from flowing is superposed on the base-material layer 3. Therefore, as shown in FIG. 3, the photo-curing resin 8 is caught by the net 10, and movement of the photo-curing resin 8 is prevented.

Therefore, during storage or transportation of the photo-curing hollow structure 1 or curing of the photo-curing resin 8, the uncured photo-curing resin 8 is not localized. The photo-curing resin 8 in the photo-curing hollow structure 1 is uniformly cured with no variation in the strength through the structure, and is suitably installed and used as a column or a beam (pipe) of outdoor equipments, such as buildings and play equipments.

In the embodiment, air or gas is injected into the internal bag layer 2 of the photo-curing hollow structure 1 through the injection port 6 by a compressor or a proper gas generator. However, instead of gas or air, it may be structured such that water is injected by a pump or the like. In such a case, after the photo-curing hollow structure 1 is inflated and cured by light, the fluid such as water is extracted.

Figure 5A:
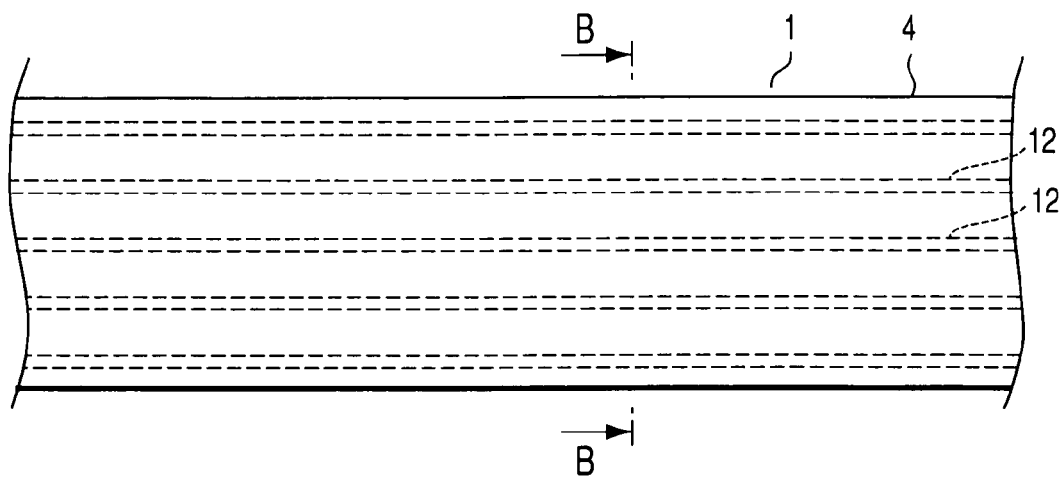
FIG. 5A is a side view of a photo-curing hollow structure of a second embodiment of the present invention.
Figure 5B:
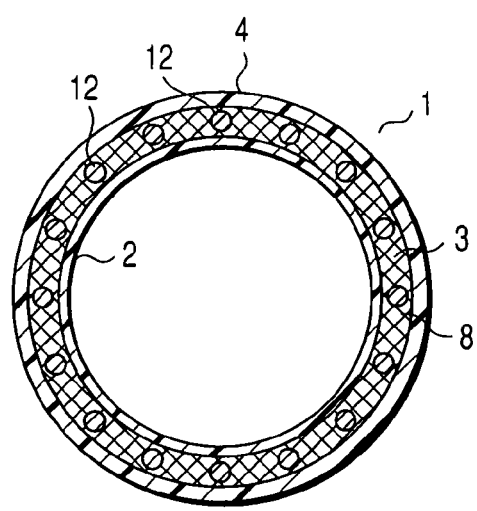
FIG. 5B is a cross-sectional view taken along line B—B of FIG. 5A.

FIGS. 5A and 5B illustrate a second embodiment. FIG. 5A is a side view of a photo-curing hollow structure, and FIG. 5B is a cross-sectional view taken along line B—B of FIG. 5A. The same constituent elements as those in the first embodiment are denoted by the same reference numerals as in the first embodiment, and explanations thereof are omitted.

A plurality of thick warps made of synthetic fiber yarn are arranged simultaneously with manufacturing of a base-material layer 3 serving as a reinforcing fiber layer of a photo-curing hollow structure 1. The thick warps 12 are arranged at regular intervals in the circumferential direction of the base-material layer 3.

According to this embodiment, during storage or transportation of the photo-curing hollow structure 1 or curing of a photo-curing resin 8, the uncured photo-curing resin 8 tends to flow downwards due to gravity. Specifically, when the photo-curing hollow structure 1 is laid, the photo-curing resin 8 in the base-material layer 3 tends to gradually circulate in the circumferential direction by gravity and move to the bottom side. However, the base-material layer 3 is provided with the thick warps 12 functioning as a flow-resisting member which prevents the photo-curing resin 8 from flowing. Therefore, the photo-curing resin 8 is caught by the thick warns 12, and is prevented from moving.

Therefore, during storage or transportation of the photo-curing hollow structure 1 or curing of the photo-curing resin 8, the uncured photo-curing resin 8 is not localized. The photo-curing resin 8 in the photo-curing hollow structure 1 is uniformly cured, and produces the same effect as in the first embodiment.

Figure 6C:
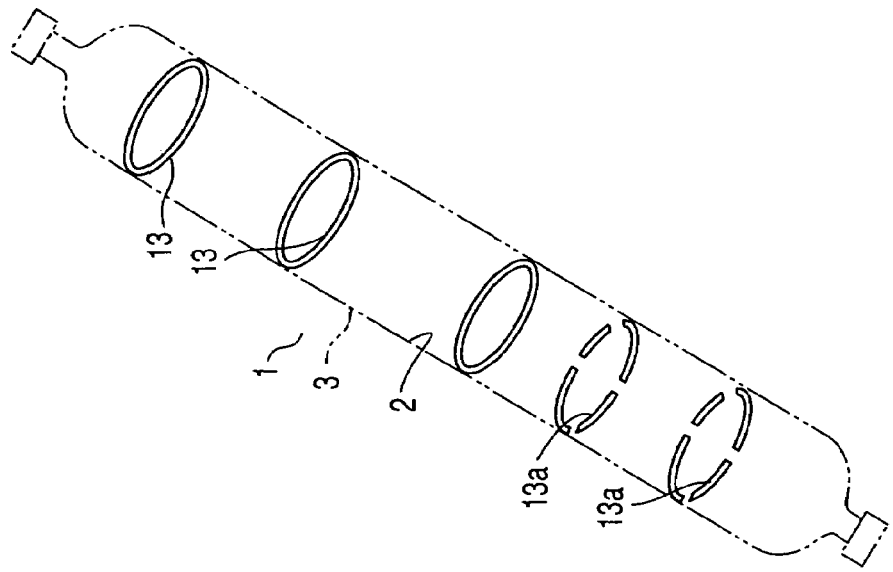
FIG. 6C is a perspective view of the photo-curing hollow structure of the embodiment.
Figure 6B:
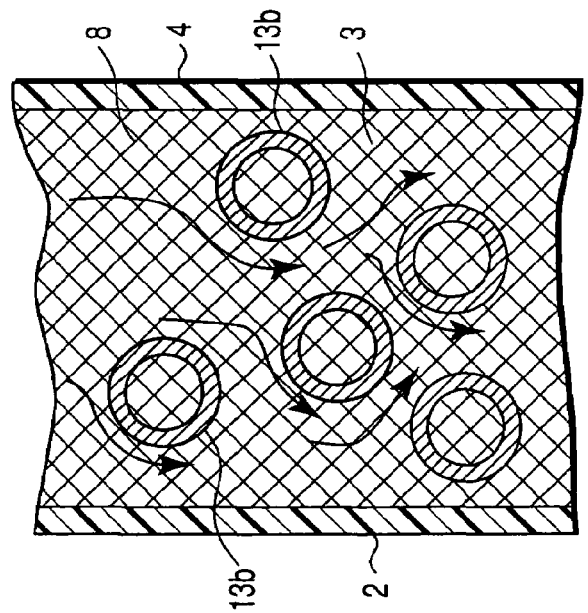
FIG. 6B is an enlarged view of a part C of FIG. 6A.
Figure 6A:
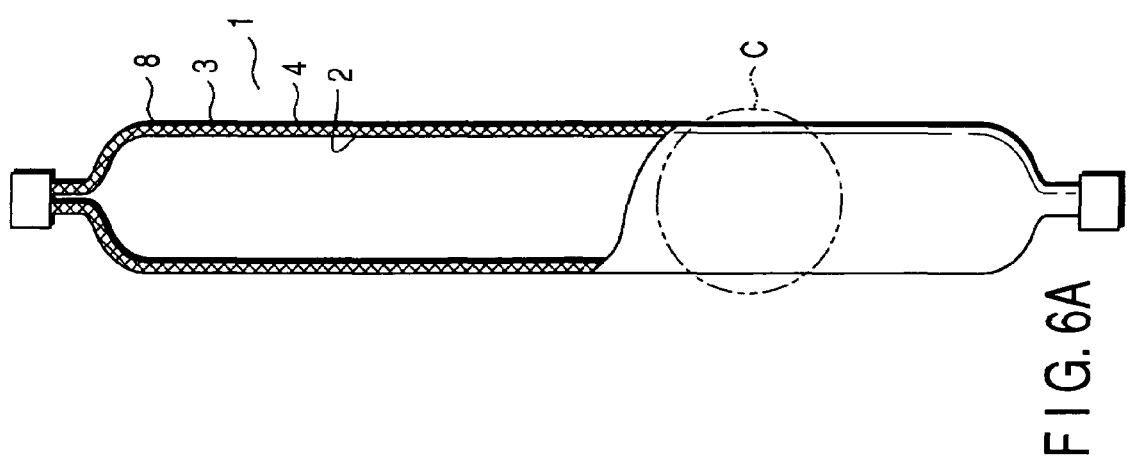
FIG. 6A is a partial cross-sectional side view of a photo-curing hollow structure according to a third embodiment of the present invention.

FIGS. 6A and 6B illustrate a third embodiment. FIG. 6A is a partial cross-sectional side view of a photo-curing hollow structure, and FIG. 6B is an enlarged view of part C shown in FIG. 6A. The same constituent elements as those in the first embodiment are denoted by the same respective reference numerals, and explanations thereof are omitted.

Cured members 13b each being cured in advance and having, for example, a ring shape, are scattered inside a base-material layer 3 in manufacturing of the base-material layer 3 serving as a reinforcing fiber layer of a photo-curing hollow structure 1. The cured members 13b are, for example, staggered inside the base-material layer 3.

The cured members 13b can be formed by curing only portions of the photo-curing hollow structure member to be cured by irradiation of a certain amount of light rays in ring shape, before the photo-curing hollow structure member is put in a light-tight storage bag.

According to this embodiment, during storage or transportation of the photo-curing hollow structure 1 or curing of a photo-curing resin 8, the uncured photo-curing resin 8 tends to flow downwards due to gravity. Specifically, when the photo-curing hollow structure 1 is disposed vertically as shown in FIG. 6A, the photo-curing resin 8 in the base-material layer 3 tends to gradually move downwards due to gravity. However, the base-material layer 3 is scattered with the cured members 13b functioning as flow-resisting members which prevent the photo-curing resin 8 from flowing. Therefore, the photo-curing resin 8 is caught by the cured members 13b, and is prevented from moving.

Therefore, during storage or transportation of the photo-curing hollow structure 1 or curing of the photo-curing resin 8, the uncured photo-curing resin 8 is not localized. The photo-curing resin 8 in the photo-curing hollow structure 1 is uniformly cured, and produces the same effect as in the first embodiment.

The cured members 13b are not limited to a ring shape, but may have a triangular or rectangular ring shape. Further, they are not limited to the same size, but the cured members of different sizes may be scattered.

As another form, as shown in FIG. 6C, ring-shaped cured members 13 which prevent flow of the photo-curing resin 8 may be arranged inside the base-material layer 3, along the peripheral surface of the photo-curing hollow structure 1 and at regular intervals in the longitudinal direction. Further, the ring-shaped cured members 13 are not limited to those each having a single-piece structure. Adopting cured members 13a each having gaps in some parts facilitates fold for storage thereof during transportation and when they are unused.

Figure 7:
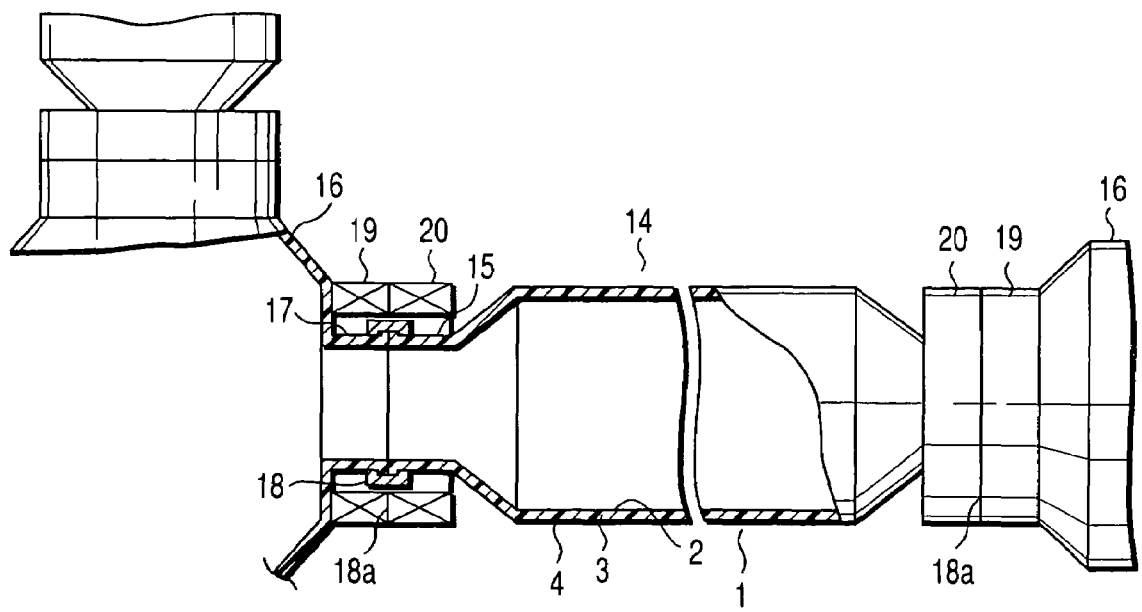
FIG. 7 is a side view illustrating a fourth embodiment of the present invention, with a partial cross section of a structure in which a plurality of truss members are connected to node members.
Figure 8A:
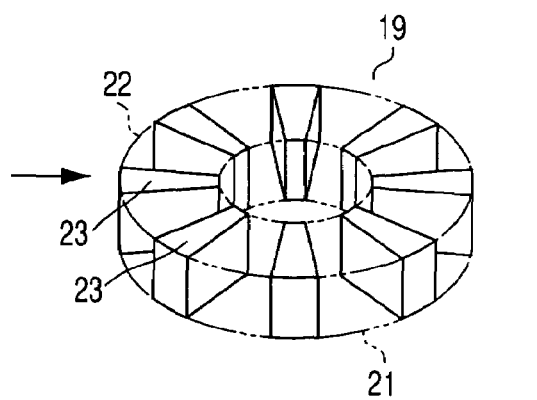
FIGS. 8A and 8B are perspective views of rotation mechanisms of the embodiment.
Figure 8B:
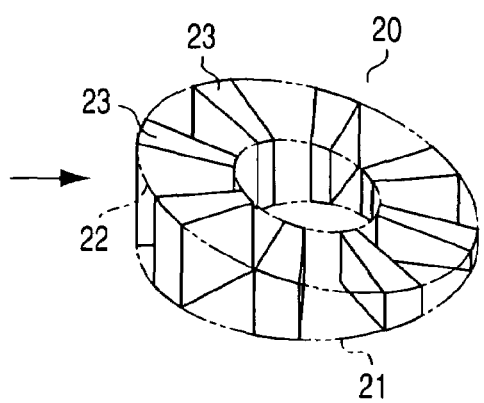

FIGS. 7 to 9 illustrate a fourth embodiment. The same constituent elements as those in the first embodiment are denoted by the same respective reference numerals, and explanations thereof are omitted. FIG. 7 is a partial cross-sectional side view of a structure in which a plurality of truss members are connected to node members, FIGS. 8A and 8B are perspective views of a rotation mechanism, and FIGS. 9A and 9B are operation explanatory views.

A truss member 14 has basically the same structure as that of the photo-curing hollow structure 1 of the first embodiment, and comprises an internal bag layer 2, a base-material layer 3 provided on an external periphery of the internal bag layer 2, and an outer layer 4 provided on an external periphery of the base-material layer 3. The whole truss member 14 is formed in a long hollow cylindrical shape. Further, a connecting portion 15 having a small-diameter tubular shape is provided on both axial end portions of the truss member 14. Further, a node member 16, to which the truss member 14 is fastened, is provided with a small-diameter tubular connecting portion 17 having the same diameter as that of the connecting portion 15.

The connecting portions 15 and 17 are rotatably connected to each other by a swivel joint 18 in the state where end surfaces thereof are in contact. The connecting portions 15 and 17 are provided with rotation mechanisms 19 and 20 described below, with the swivel joint interposed therebetween. One rotation mechanism 19 is fastened to the node member 16, and the other rotation mechanism 20 is fastened to the truss member 14. Further, a sheet 18a, such as Teflon (trademark), having a low coefficient of friction is interposed between the rotation mechanisms 19 and 20.

The rotation mechanisms 19 and 20 have the same structure, and formed as shown in FIGS. 8A and 8B. Specifically, a plurality of thermal-expansion members 23 serving as thermal-deformation members are radially arranged at regular intervals in the circumferential direction between a right-and-left pair of annular members 21 and 22. Further, when heat such as sunbeam is applied only from the direction of an arrow as shown in FIG. 8A, the heat-expansion members 23 arranged on the arrow direction expand, and the heat-expansion members 23 arranged on a side opposite to the arrow direction do not expand. Therefore, as shown in FIG. 8B, the one annular member 22 is inclined to the other annular member 21.

Further, as shown in FIGS. 9A and 9B, the pair of rotation mechanisms 19 and 20 is provided to the connecting portions 15 and 17, with the swivel joint 18 interposed therebetween, in the state where their annular members 22 are joined. Thereby, when heat such as sunbeam is applied only from the direction of arrows as shown in FIG. 9A, heat-expansion members 23 of the arrow direction expand, and heat-expansion members 23 on a side opposite to the arrow direction do not expand. Therefore, as shown in FIG. 9B, the one annular member 22 is inclined to the other annular member 21, and the truss member 14 rotates around its axial line by 180° in the arrow direction. Therefore, portions which were not subjected to the sunbeam are opposed to the sunbeam (arrow direction).

In such a case as described above, by the rotation of the truss member 14 around the axial line, uncured photo-curing resin 8 is not localized during curing of the photo-curing resin 8 of the truss member 14 formed of the photo-curing hollow structure 1. Therefore, there is the advantage that the photo-curing resin 8 in the photo-curing hollow structure 1 is cured at an almost equal speed.

In the fourth embodiment, the thermal-expansion members 23 serving as the thermal deformation members may be bellows containing a fluid which expands by heat, a solid, a shape memory alloy or shape memory resin having a high thermal expansion coefficient.

FIG. 10 illustrates a fifth embodiment. The same constituent elements as those in the first and fourth embodiments are denoted by the same respective reference numerals, and explanations thereof are omitted. FIG. 10 is a partial cross-sectional side view of a structure in which a plurality of truss members are connected to node members.

Connecting portions 15 and 17 of truss member 14 and a node member 16 are rotatably connected by a swivel joint 18, in the state where end surfaces thereof are in contact. A helical member 24 made of thermal deformation material, such as shape memory alloy, heat-shrinkable synthetic resin, or a resin tube containing a heat-expansive fluid, is wound as a rotation mechanism around the connecting portions 15 and 17, so as to straddle the swivel joint 18. Further, the helical members 24 are wound such that they form reverse winding (mirror symmetry) between the both end portions of the truss member 14. Each of the helical members 24 is wound several or several tens of times, and one end thereof is fastened to the truss member 14 and the other end is fastened to the node member 16.

Therefore, when heat such as sunbeam is applied only from the direction of arrows as shown in FIG. 10, the helical members 24 are distorted while being shrunk by heat, thus the truss member 14 rotates around its axial line by 180° or more, not limited to 180°, in the arrow direction. The angle of the rotation can be preset by adjusting the number of times of winding the helical members 24 and the force thereof generated by reception of light in design and manufacturing.

As described above, by the rotation of the truss member 14 around the axial line, uncured photo-curing resin 8 is not localized during curing of the photo-curing resin 8 of the truss member 14 made of the photo-curing hollow structure 1. Therefore, the photo-curing resin 8 in the photo-curing hollow structure 1 is uniformly cured, and the same advantage as that of the fourth embodiment is obtained.

Figure 11:
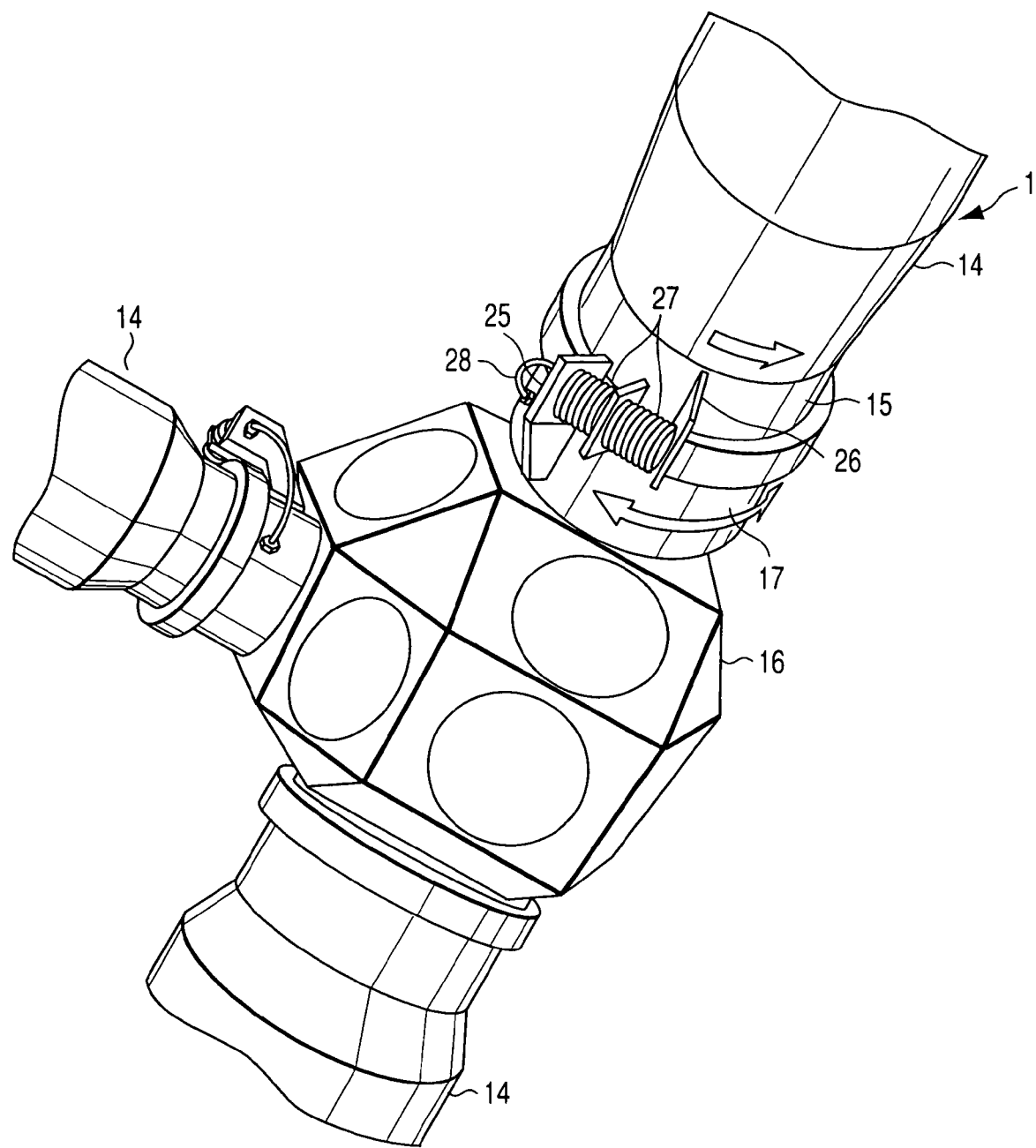
FIG. 11 is a side view illustrating a sixth embodiment of the present invention, with a cross-sectional view of a part of a structure in which a plurality of truss members are connected to a node member.

FIG. 11 illustrates a sixth embodiment. The same constituent elements as those in the first, fourth and fifth embodiments are denoted by the same respective reference numerals, and explanations thereof are omitted. FIG. 11 is a partial cross-sectional side view of a structure in which a plurality of truss members are connected to a node member.

Connecting portions 15 and 17 of truss member 14 and a node member 16 are rotatably connected by swivel joints 18, in the state where end surfaces thereof are in contact. Brackets 25 and 26 projecting towards a swivel joint 18 and opposed to each other are fixed on the connecting portions 15 and 17. A bellows 27 which expands and contracts by pressure is provided between the pair of brackets 25 and 26. The bellows 27 is connected with a pipe 28 which leads the internal pressure of the truss member 14 and the node member 16 to the bellows 27.

Therefore, when the internal pressure of the truss member 14 and the node member 16 rises, the internal pressure of the bellows 27 rises through the conduit 28, and therefore the bellows 27 expands. Thus, since the brackets 25 and 26 are moved away from each other, the truss member 14 rotates around its axial line. When the internal pressure of the truss member 14 and the node member 16 falls thereby, the internal pressure of the bellows 27 falls through the pipe 28, and thus the bellows 27 contracts. Therefore, since the brackets 25 and 26 come close to each other, the truss member 14 rotates in the reverse direction around its axial line. Therefore, the truss member 14 rotates in the normal and reverse directions according to the internal pressure of the truss member 14 and the node member 16. The truss member 14 can be rotated in the normal and reverse directions, by intentionally rising or lowering the internal pressures.

As described above, by the rotation of the truss member 14 around the axial line, uncured photo-curing resin 8 is not localized during curing of the photo-curing resin 8 of the truss member 14 made of the photo-curing hollow structure 1. Therefore, the photo-curing resin 8 in the photo-curing hollow structure 1 is uniformly cured, and the same advantage as that of the fourth embodiment is obtained.

In the sixth embodiment, the truss member 14 can be rotated in the normal and the reverse directions, by broadening and narrowing the interval between the brackets 25 and 26, with a cylinder and a piston instead of the bellows 27.

In the fourth, fifth and sixth embodiments, explained is the mechanism in which the truss member 14 rotates around its axial line. When curing of the whole structure by light is completed, the mechanism of rotation becomes unnecessary. Therefore, the function of rotating the truss member 14 in the normal and the reverse directions may be fixed, after curing of the whole structure is completed. For example, a slow-curing photo-curing adhesive is applied to a part of the swivel mechanism 18 in the fourth, fifth and sixth embodiments, or a photo-curing resin is applied to the case of the thermal-expansion members 23 in the fourth embodiment.

FIG. 12 illustrates a seventh embodiment. The same constituent elements as those in the first embodiment are denoted by the same respective reference numerals, and explanations thereof are omitted. FIG. 12 is a side view of a structure in which a truss member is connected to a node member.

Although photo-curing resins are cured by sunlight or light of an artificial light source, it is known that the reaction thereof is accelerated by further heating them and rising the temperature thereof, in the same manner as in general chemical reaction.

In the embodiment, ring-placed thermal-conductive members 30 made of material having a high thermal conductivity, such as carbon fiber and metal thin wire, are arranged on a base-material layer 3 of a photo-curing hollow structure 1 forming a truss member 14, around the circumferential direction and at regular intervals in the axial direction.

Therefore, when heat such as sunbeam is applied only from a direction of arrows as shown in FIG. 12, although sides of the thermal-conductive members 30 to which the sunbeam is applied are heated, the heat is conducted to sides which are not irradiated with sunbeam, by the thermal-conductive function of the thermal-conductive members 30. Therefore, the parts to which no sunbeam was applied are also heated by heat conduction. This prevents remarkable acceleration, by heat from the sun, of reaction of only one side to which sunlight is applied, during curing of a photo-curing resin 8 of the truss member 14 made of the photo-curing hollow structure 1, and thus the uncured photo-curing resin 8 is not localized. Therefore, the photo-curing resin 8 in the photo-curing hollow structure 1 is uniformly cured, and the same effect as of the fourth embodiment is obtained.

FIG. 13 illustrates an eighth embodiment. The same constituent elements as those in the first embodiment are denoted by the same respective reference numerals, and explanations thereof are omitted. FIG. 13 is a cross-sectional view of a structure in which a truss member is connected to a node member.

An internal bag layer of a photo-curing hollow structure 1 forming a truss member 14 is formed of a transparent film 31. When sunlight is applied only from a direction of arrows, the sunlight passes through a hollow portion of the photo-curing hollow structure 1, and reaches the photo-curing resin 8 on the opposite side.

Although the photo-curing resin 8 on the side to which sunlight is applied is mainly subjected to the light, the sunlight passes through the transparent film 31 and further through the hollow portion of the photo-curing hollow structure 1, and reaches the photo-curing resin 8 on the opposite side. Therefore, light is also applied to parts, to which sunlight is not applied in the case where the internal bag layer is made of an opaque material. This avoids the situation in which curing of only one side progresses and curing reaction of the other side does not progress smoothly, during curing of the photo-curing resin 8 of the truss member 14 formed of the photo-curing hollow structure 1. Therefore, the photo-curing resin 8 in the photo-curing hollow structure 1 is uniformly cured, and the same effect as of the fourth embodiment is obtained.

As described above, it is possible to inhibit localization of the photo-curing resin due to gravity, and form a hollow structure having a predetermined shape suitable for its purpose.

Further, it has the effect that uncured photo-curing resin is not localized during curing of the photo-curing resin, and the photo-curing resin in the photo-curing hollow structure is cured at almost equal speed.

It is possible to inhibit localization of photo-curing resin due to gravity and acceleration during transportation, and obtain a hollow structure having a predetermined shape suitable for its purpose. Therefore, it is effective in setting up temporary housing such as prefabricated houses and tents in a disaster-striken area, to aid disaster victims in an emergency such as natural or man-made disasters.

What is claimed is:

1. A photo-curing hollow structure, comprising:
a fluid-injectable internal bag layer;
a base-material layer superposed on an external periphery of the internal bag layer and impregnated with a photo-curing resin; and
an outer layer superposed on an external periphery of the base-material layer and having transparency,
the hollow structure having, in an unused state, flexibility and being stored and kept in a light-tight storage bag or case, the hollow structure when used being taken out of the storage bag or case, wholly expanded by injection of a fluid into the internal bag layer, and formed into a hollow molded structure by direct sunlight or light of an artificial light source passing through the outer layer and curing the base-material layer in an expanded state,
wherein the base-material layer comprises a reinforcing fiber layer impregnated with a fluid photo-curing resin, and a net formed into a grid superposed on the reinforcing fiber layer enclosing the reinforcing fiber layer and preventing the photo-curing resin from flowing due to gravity.

2. A photo-curing hollow structure, comprising:
a fluid-injectable internal bag layer;
a base-material layer superposed on an external periphery of the internal bag layer and impregnated with a photo-curing resin; and
an outer layer superposed on an external periphery of the base-material layer and having transparency,
the hollow structure having, in an unused state, flexibility and being stored and kept in a light-tight storage bag or case, the hollow structure when used being taken out of the storage bag or case, wholly expanded by injection of a fluid into the internal bag layer, and formed into a hollow molded structure by direct sunlight or light of an artificial light source passing through the outer layer and curing the base-material layer in an expanded state,
wherein the base-material layer comprises a reinforcing fiber layer impregnated with the photo-curing resin, and a flow-resisting member which prevents circumferential flow of the photo-curing resin, the flow-resisting member being a plurality of thick warps woven on the reinforcing fiber layer, arranged at desired intervals in a circumferential direction of the base-material layer, and extending over a longitudinal direction of the base-material layer.

3. A photo-curing hollow structure, comprising:
a fluid-injectable internal bag layer;
a base-material layer superposed on an external periphery of the internal bag layer and impregnated with a photo-curing resin; and
an outer layer superposed on an external periphery of the base-material layer and having transparency,
the hollow structure having, in an unused state, flexibility and being stored and kept in a light-tight storage bag or case, the hollow structure when used being taken out of the storage bag or case, wholly expanded by injection of a fluid into the internal bag layer, and formed into a hollow molded structure by direct sunlight or light of an artificial light source passing through the outer layer and curing the base-material layer in an expanded state,
wherein the base-material layer comprises a reinforcing fiber layer impregnated with the photo-curing resin, and pre-cured members formed by curing only portions of the photo-curing resin arranged in portions of the reinforcing fiber layer and preventing flow of the photo-curing resin.

4. A photo-curing hollow structure according to claim 3, the pre-cured members being ring-shaped cured members arranged scatteringly inside the base-material layer.

5. A photo-curing hollow structure, comprising:
a fluid-injectable internal bag layer;
a base-material layer superposed on an external periphery of the internal bag layer and impregnated with a photo-curing resin; and
an outer layer superposed on an external periphery of the base-material layer and having transparency,
the hollow structure having, in an unused state, flexibility and being stored and kept in a light-tight storage bag or case, the hollow structure when used being taken out of the storage bag or case, wholly expanded by injection of a fluid into the internal bag layer, and formed into a hollow molded structure by direct sunlight or light of an artificial light source passing through the outer layer and curing the base-material layer in an expanded state, wherein ring-shaped thermal conductive members made of fiber having high thermal conductivity are arranged around a circumferential direction and at regular intervals in an axial direction on a reinforcing fiber layer forming the base-material layer, the reinforcing fiber layer impregnated with a photo-curing resin.

* * * * *